United States Patent [19]
Brinkmeyer et al.

[11] Patent Number: 5,774,550
[45] Date of Patent: Jun. 30, 1998

[54] VEHICLE SECURITY DEVICE WITH ELECTRONIC USE AUTHORIZATION CODING

[75] Inventors: Horst Brinkmeyer, Waiblingen; Michael Daiss, Filderstadt; Günter Schwegler, Weinstadt; Bertolt Krüger, Bonn, all of Germany

[73] Assignee: Mercedes-Benz AG, Germany

[21] Appl. No.: 882,929

[22] Filed: Jun. 26, 1997

Related U.S. Application Data

[63] Continuation of Ser. No. 415,376, Apr. 3, 1995.

[30] Foreign Application Priority Data

Apr. 1, 1994 [DE] Germany ............................ 44 11 451.6

[51] Int. Cl.$^6$ ....................................................... H04L 9/16
[52] U.S. Cl. ................................. 380/21; 380/23; 380/25; 380/49; 340/825.31
[58] Field of Search ................................. 380/23, 25, 21, 380/48, 49; 340/825.31, 825.34

[56] References Cited

U.S. PATENT DOCUMENTS

| | | | |
|---|---|---|---|
| 4,405,829 | 9/1983 | Rivest et al. ............................... | 380/30 |
| 4,509,093 | 4/1985 | Stellberger ............................... | 360/172 |
| 4,736,419 | 4/1988 | Roe ............................................ | 380/3 |
| 4,786,900 | 11/1988 | Karasawa et al. ................... | 340/825.31 |
| 4,837,822 | 6/1989 | Crosley et al. ........................... | 380/23 |

(List continued on next page.)

FOREIGN PATENT DOCUMENTS

| | | | |
|---|---|---|---|
| 2597142A1 | 10/1987 | France ............................ | E05B 49/00 |
| 28 24 421A1 | 12/1979 | Germany ....................... | H03K 13/00 |
| 29 11 828A1 | 10/1980 | Germany ....................... | E05B 65/36 |
| 32 25 754A1 | 7/1982 | Germany ....................... | E05B 47/00 |
| 32 34 539A1 | 3/1984 | Germany ....................... | E05B 49/00 |
| 33 13 098C1 | 10/1984 | Germany ....................... | E05B 49/00 |
| 4411449C1 | 3/1995 | Germany ....................... | B60R 25/00 |
| A 176043 | 7/1988 | Japan .............................. | H04L 9/00 |
| A 152341 | 12/1988 | Japan .............................. | H04L 9/32 |
| A 152341 | 6/1990 | Japan .............................. | H04L 9/00 |
| A 302682 | 10/1992 | Japan . | |

OTHER PUBLICATIONS

"A Dynamic Password Authenticatino Method ... " Systems and Computers in Japan, vol. 22, Nol. 7, 1991, Akihiro Shimizu.

"Password Authentication with Insecure Communication", Communications of the ACM, Nov. 1981, vol. 24, No. 11, Leslie Lamport.

"Diebstahlschutz Für das Auto" [Protecting Cars Against Theft] from Temic Telefunken microelektronik GmbH dated Aug. 1993.

"A Method for Obtaining Digital Signatures and Public–Key Cryptosystems," R.L. Rivest et al., Communications of the ACM, vol. 21, No. 2, Feb. 1978, pp. 120–126.

Part III Recommended Integrity Primitives, Chapter 7 RSA, pp. 174–190.

Bruce Schneier, "Applied Cryptography" 2nd edition John Wiley and Sons, N. Y. 1995 p. 53.

Bruce Schneier, "Applied Cryptography" 2nd edition John Wiley and Sons, N. Y. 1992 p. 47.

Primary Examiner—Thomas H. Tarcza
Assistant Examiner—Pinchus M. Laufer
Attorney, Agent, or Firm—Evenson, McKeown, Edwards & Lenahan, P.L.L.C.

[57] ABSTRACT

The invention provides a vehicle security device with an electronic use-authorization coding arrangement for preventing unauthorized access to the vehicle. The vehicle security device utilizes digital signature algorithm for encrypting and transmitting authorization and synchronization information, so that the storage of secret information is essential only at the key unit in order to transmit authorization and/or synchronizing information from the key unit to the vehicle unit in a way which is very effectively protected against falsification. Thus, reading out vehicle unit information does not permit unauthorized manufacture of a copied key.

12 Claims, 3 Drawing Sheets

U.S. PATENT DOCUMENTS

| | | | |
|---|---|---|---|
| 4,928,098 | 5/1990 | Dannhaeuser | 340/825.56 |
| 4,992,785 | 2/1991 | Lewiner et al. | 340/825.34 |
| 5,144,667 | 9/1992 | Pogue, Jr. et al. | 380/45 |
| 5,146,215 | 9/1992 | Drori | 340/825.32 |
| 5,191,610 | 3/1993 | Hill et al. | 380/21 |
| 5,253,295 | 10/1993 | Saada et al. | 380/23 |
| 5,365,225 | 11/1994 | Bachhuber | 340/825.31 |
| 5,369,706 | 11/1994 | Latka | 380/23 |
| 5,377,270 | 12/1994 | Koopman, Jr. et al. | 380/25 |
| 5,479,154 | 12/1995 | Wolfram | 340/825.31 |
| 5,508,687 | 4/1996 | Gebhardt et al. | 340/825.31 |
| 5,508,692 | 4/1996 | Wolfram | 340/825.31 |

VEHICLE SECURITY DEVICE WITH ELECTRONIC USE AUTHORIZATION CODING

This application is a continuation of application Ser. No. 08/415,376, filed on Apr. 3, 1995.

BACKGROUND AND SUMMARY OF THE INVENTION

The invention relates to a vehicle security device having electronic use authorization coding for preventing unauthorized use of the vehicle.

Vehicle security devices of this generic type are known, such as, for example, electronic disabling devices which operate according to a so-called alternating code method for protecting the vehicle against unauthorized use by a third party. Such a system is described in the company brochure "Diebstahlschutz fur das Auto" [Protecting cars against theft] from TEMIC TELEFUNKEN microelektronik GmbH dated August 1993. In comparison with fixed code methods which were customary in the past (such as described for example in the German patent document DE 29 11 828 A1), in such alternating code methods, safeguarding against unauthorized use of the vehicle after one or more of the code transmission protocols have been intercepted is enhanced by changing the code information at each so-called authentification process, (i.e., at each testing of the use authorization). This code change can be implemented only from the key unit to the vehicle unit in compliance with the unidirectional code information transmission known from the fixed code method, by a secret item of base counting information and an algorithm which is stored both in the key unit and at the vehicle unit. By means of this algorithm, successive items of code information can be derived from the base number, so that at the vehicle unit the user authorization can be tested by comparing the code information produced at the vehicle unit with the code information transmitted at the key unit.

A difficulty posed by such unidirectional systems resides in the procedure for synchronization of the key unit and vehicle unit. Such synchronization is not only desirable (for example, after a defect has been eliminated or when a replacement unit has been used at the key unit or vehicle unit), but is particularly critical for security since an unauthorized person may, in the future, possibly gain unrestricted authorization as an authorized user by means of a successful synchronization manipulation.

Alternatively, it is known to provide both the key unit and vehicle unit, after each successful authentication, with a new randomly selected or deterministically specified authorizing item of code information for the next authentication. See, for example, the German patent document DE-OS 32 34 539 A1 and the German patent document DE-PS 33 13 098 C1. However, such controlled synchronization requires a wireless bidirectional exchange of data, or an exchange via electrically conductive contact between the key unit and a piece of vehicle equipment which is involved in the process.

Moreover, in addition to the alternating code methods which use unidirectional data transmission for authentication, so-called symmetrical encryption methods are known in which the authentication is performed by means of bidirectional data exchange, one secret coding algorithm of the same type being stored at both the key unit and the vehicle unit, respectively. This algorithm generates an item of code information in response to an item of input information (e.g. an item of random counting information, fed to both units), the key-unit code information being subsequently transmitted to the vehicle unit and tested there for correspondence with the code information generated at the vehicle unit. A method of this kind is described in the German patent document DE-OS 32 25 754 A1.

Consequently, all the above known methods require the storage of an item of secret information at the vehicle unit. Thus, not only is there a certain risk of unauthorized reading out of this item of secret information from the vehicle unit, but in addition, care must be taken that such secret data information be protected at the vehicle unit, which necessitates corresponding logistic outlay on security at the vehicle manufacturer's and in garages.

German patent document DE-OS 28 24 421 A1 discloses an antitheft device in a motor vehicle in the form of a circuit in which binary pattern memories of the same kind are provided at the key unit and vehicle unit. The binary patterns stored therein have a prescribed relation to one another (being, for example, identical). When the circuit is activated, the binary pattern stored at the key unit is read out and transmitted in unencrypted form together with a synchronization signal to the vehicle unit. The vehicle unit component of the circuit receives the key unit binary pattern, reads out the binary pattern stored in the vehicle unit memory and compares both patterns under the control of the transmitted synchronization signals on a bit-by-bit basis. Only if the two binary patterns accord with the prescribed relation to one another is the system which is actuated by the circuit unlocked (i.e., enabled).

One object of the present invention is to provide a vehicle security device of the type mentioned above, which uses only simple unidirectional data transmission, offers a relatively high degree of protection against unauthorized use of the vehicle by third parties, is convenient to operate, and provides a way of synchronizing the key and vehicle units which is very secure against manipulation without need for storing secret information at the vehicle unit.

This and other objects and advantages are achieved by the vehicle security system according to the invention, which utilizes a digital signature algorithm, known from cryptography for protected telecommunication transmission, to achieve secure transmission of data information from the key unit to the vehicle unit by means of very secure logic link, without requiring storage of an item of secret information at the vehicle unit. This digital signature implementation can optionally be used for secure transmission of user code information for authentication purposes or synchronization information when a less complex algorithm is used for authentication, in order to synchronize the key unit and vehicle unit for subsequent authentication processes on request (for example, after a unit involved has been replaced, or automatically at prescribed intervals). It is not absolutely necessary for an item of secret information to be stored at the vehicle unit since the verification component of a digital signature algorithm does not require any secret data; this saves logistic outlay on security at the vehicle manufacturer's and in garages. Furthermore, copied keys, with which a successful authentication is possible, cannot be manufactured by reading out the code information stored at the vehicle unit. The omission of logistic security measures is then a particularly important factor if a plurality of pieces of equipment is involved in the authentication at the vehicle unit in order to make it uneconomical to bypass the disabling facility by simply replacing one or a small number of pieces of equipment involved in authentication.

In one embodiment of invention, the Rivest-Shamir-Adleman ("RSA") algorithm, which is known in the field of communications encryption, is used as a digital signature algorithm. A digital signature algorithm is a method utilized by a group of users (persons or technical units) to generate a unique digital signal to prove the correctness and origin of messages. More specifically, a digital signature algorithm allows a user A to compute a digital value $S_A(m)$ for a given message with properties m, such that:

1. Any user B can use a corresponding algorithm to verify that $S_A(m)$ is a correct signature for m by A;

2. No user B different from A can compute $S_A(m')$ for a given message m'; and

3. No message m' different from m can be found in a feasible manner, which has the same signature; that is $S_A(m)=S_A(m')$.

The RSA algorithm is discussed in R. L. Rivest, A. Shamir and L. Adleman, "A Method for Obtaining Digital Signature and Public Key Cryptosystems," Communications of the ACM, Vol. 21, pp. 120–126 (1978). Such encryption algorithms are also discussed in detail in U.S. Pat. No. 4,405,829.

In a particularly advantageous embodiment of the invention the code security of the authentication is based on an inherent definitional property of a mathematical "one-way function". A one-way function is defined here as a mathematical function for which the function value associated with a given inverse image can be determined from its domain unambiguously and comparatively easily, while even with the maximum computational outlay available, in practice it is not possible to find an inverse image for a given one-way function value. (In mathematics the term "inverse image" refers to a set of input values used to generate an associated set of function values by means of a function f. If $y=f(x)$, then a value $x_1$, associated with a particular function value $y_1$, may be referred to as the inverse image of $y_1$. That is, $x_1=f^{-1}(y_1)$.) Thus, the algorithm for calculating a value of a one-way function associated with an inverse image is comparatively simple, but on the other hand the acquisition of an inverse image which is associated with a given value of a one-way function is not possible with a practically realizable computational outlay.

The latter proposition, of course, depends largely on the computer capacity available. At the current state of computer technology, such one-way functions, e.g. in the form of so-called hash functions, are known and are principally used for protecting information in cryptography, it being possible nowadays for approximately $2^{50}$ calculation and memory processes of hash values to be attained as the upper limit for the computational outlay which can be practically coped with.

The hash function, sometimes called a message-digest algorithm, compresses messages of arbitrary length to a 128-bit output block, that is called the fingerprint, hashcode, hash value or message-digest of the message. It is regarded as computationally infeasible to produce two messages having the same hashcode, or to produce any messages having a given prespecified target hashcode. Hash functions with these properties are known and used in message authentication applications such as the protection of the integrity and the origin of data stored or transmitted using secret-key or public-key techniques.

Because of the practical irreversibility of the one-way function, the one-way function values at the vehicle unit do not have to be treated as secret, since even unauthorized readout of the values from the vehicle would not permit an unauthorized person to discover the associated inverse images and thus produce an electronic copy of the key. Security of the system against interception and exploitation of an authentication attempt is provided by the fact that a new item of code information is transmitted for each authentication attempt. Depending on the result of the comparison of actual and desired authorization information, the authentication unit in the vehicle unit outputs an item of use-enabling information which in the case of a positive authentication attempt leads to an associated electronic disabling facility being deactivated, and in the case of a negative (unsuccessful) authentication attempt causes it to remain activated. In the latter case, the electronic disabling facility ensures that after the ignition key is withdrawn, at least one piece of vehicle side equipment that is necessary either for access to the vehicle or for the operation of the vehicle (for example, a lock control, an engine control device etc.), remains disabled. In this case, the signature algorithm serves to transmit from the key unit to the vehicle unit (on request, or automatically at prescribed intervals) an item of new desired authorization information to the vehicle unit in code-protected form, for the purpose of synchronization.

Thus, this embodiment offers a relatively high degree of protection against unauthorized use of the vehicle by third parties, with a comparatively low outlay. It is therefore impossible for an unauthorized person, simply by intercepting an authentication process or synchronization process or reading out vehicle-end code information, subsequently to use the vehicle without authorization by successful authentication or synchronization using the intercepted or readout information. The normal authentication process by calculation of one-way function values can be realized very quickly with readily available computational capacity at the vehicle unit, without a waiting time which is troublesome for the user. On the other hand the computationally more costly signature activation for synchronization takes place only in special cases, such as the occurrence of faults in the authentication component, when a replacement key or device is provided, or at relatively large intervals (for example, several hundred authentication processes). In order to avoid waiting times during synchronization, there may be provision also to transmit a portion of the comparatively long signature (for example, an RSA signature of 512 bits) during each authentication process, and to reassemble these portions at the vehicle unit for a synchronization taking place at intervals.

One embodiment of the invention provides individual sequences of inverse images in the key unit in a manner which is advantageous and simple, by successive iteration of the one-way function, with the calculated values being read out backwards during ongoing key operation (i.e., from the last inverse image determined, to the initial one). At the vehicle unit, this arrangement provides the technical advantage in terms of memory that not all the one-way function values associated with the inverse images must be stored. Instead, for the provision of the desired authorization information, the initial storage (by means of a signature-protected synchronization process) of the one-way function value associated with the first transmitted inverse image is sufficient. This memory information is then overwritten during every successful authentication using the same key unit to transmit the inverse image information transmitted for this authentication. That is, a previously transmitted inverse image is always precisely the one-way function value of the next inverse image transmitted. The power of the individual sequences consequently determines the interval between two synchronizations for a key unit.

In another embodiment of the invention, a so-called capture range is formed at the vehicle unit, which makes it possible, within prescribed limits, to synchronize automatically the vehicle unit with the key unit again without signature activation, if the synchronization is lost as a result of one or more transmissions of the key unit which are not received at the vehicle unit. If the one-way function value of an inverse image received as actual authentication information does not correspond to the instantaneous vehicle-end desired authentication information, this feature permits a recursive iteration of the one-way function for a prescribed maximum number of repetitions (the "capture range"). In this process, the one-way function value which is produced each time from the previous actual authentication information serves as new actual authentication information. If the newly determined actual authentication information corresponds (within the permitted number of iterations in the capture range) with the desired authentication information stored at the vehicle unit, a positive authentication attempt is determined; the disabling facility is then deactivated, and the transmitted inverse image information is stored as new desired authentication information for the next authentication attempt with this key. The one-way function used in the system according to the invention can be one of the hash functions known from cryptography, and specifically the RIPEMD algorithm, which, according to the current state of cryptography, can be assumed to have the required one-way function property.

In a further embodiment of the invention, a plurality of vehicle-end pieces of equipment which are involved concurrently in the authentication process, are advantageously connected via a common data bus. This decentralization of authentication, which can extend over all pieces of equipment necessary for vehicle operation, makes mechanical bypassing of the disabling device (by replacing equipment) substantially more difficult, since all such pieces of equipment affected by the authentication and the disabling device would then have to be replaced in order to make it possible for the vehicle to be used by an unauthorized person who does not have the means of achieving successful authentication. The pieces of equipment involved, in particular control devices for the electronic systems of the vehicle, can be selected such that replacing them would require an unreasonably high outlay in relation to the benefit gained, and would therefore be unattractive. Each piece is equipped here with a signature verification component.

In yet another embodiment of the invention, locking control of the vehicle is included in the authentication, so that not only is it impossible to start the vehicle without authorized authentication, but neither can it be opened without violence. If further pieces of equipment are involved, they may be connected to one another, (for example by means of a data bus) and to the locking control. A single vehicle unit receiver for the data transmitted at the key unit is then sufficient, it being possible for the receiver to be assigned for example to the locking control.

Still another embodiment of the invention has the advantage that, in the initial identification testing of the vehicle and the key, it is determined whether legitimized hardware units are connected to one another before the actual authentication process or synchronization process is carried out. In this manner, unnecessary activation of operations which cannot succeed because of an incorrect key/vehicle combination, are avoided.

A final embodiment of the invention permits the use of a plurality of keys for the vehicle, in a manner which is advantageous for circuit technology and still retains the signature algorithm. By using an item of vehicle-specific signature information which is uniform for the entire key set, only a single item of associated verification information needs to be stored at the vehicle unit.

Other objects, advantages and novel features of the present invention will become apparent from the following detailed description of the invention when considered in conjunction with the accompanying drawings.

DETAILED DESCRIPTION OF THE DRAWING

Figure 1:
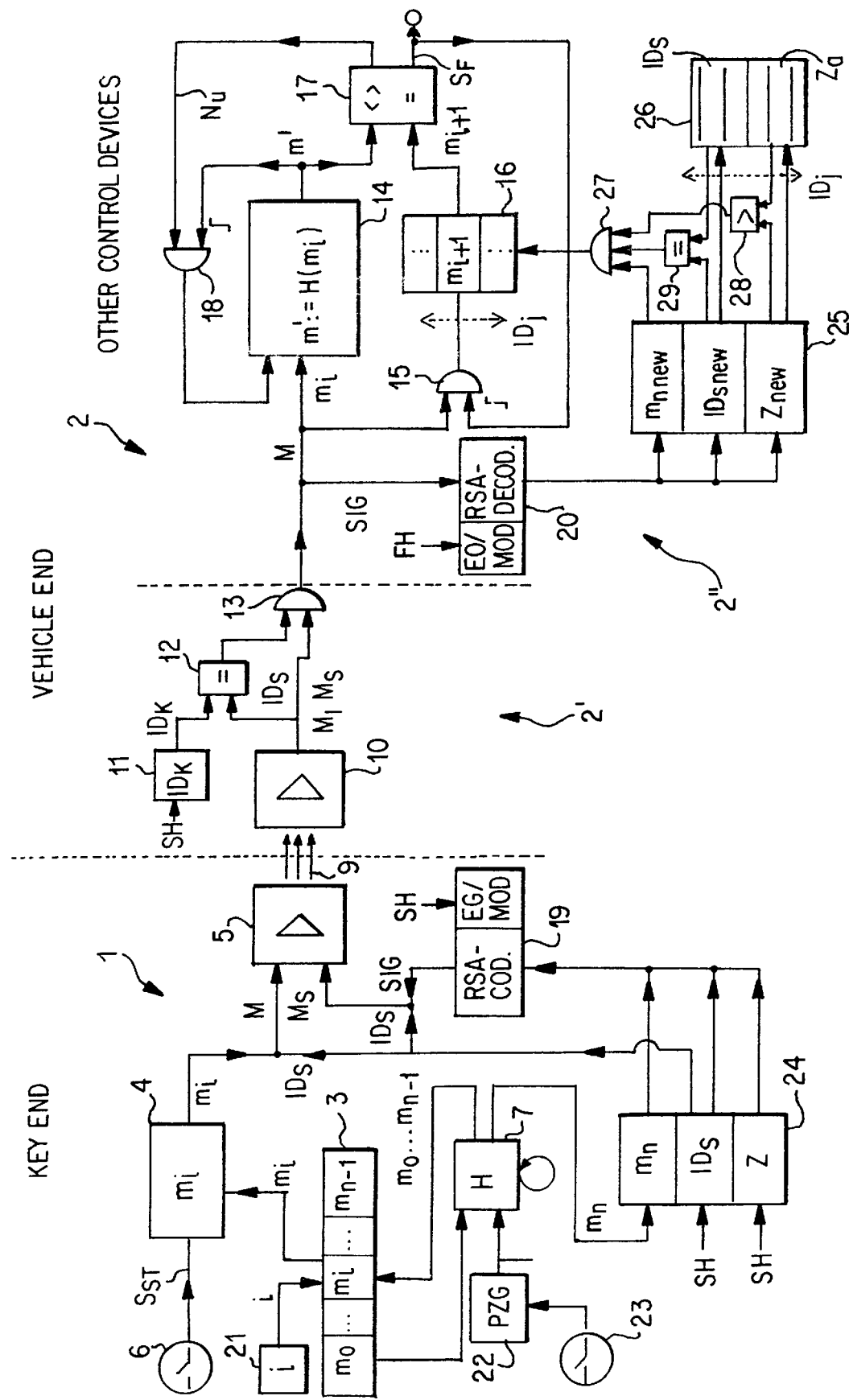
FIG. 1 shows a block diagram of a vehicle security device according to a preferred embodiment of the invention, with electronic use-authorization testing by means of unidirectional transmission of code data and a synchronization facility.

The vehicle security device according to the invention contains at the user end a plurality (e.g. eight) of electronic keys (1), one of which is shown by way of example, and at the vehicle unit a plurality of pieces of equipment (2) which are involved in protecting the vehicle against unauthorized use. One of these is a locking control which is illustrated to serve as an example for the other pieces of equipment. (The other pieces of equipment may be, for example, other control devices of the vehicle's electrical system.) Here, the circuit component (2') (illustrated in the figure at the vehicle unit between of the two vertical dotted dividing lines) is present only in the locking control, while the circuit component (2") which is located to the right of both vertical dotted lines is present in an identical form for all the pieces of equipment involved. All the pieces of equipment (2) involved in protection communicate (in a conventional manner which is not shown) with one another and with the receiver-end circuit component (2') present in the locking control, via a conventional data bus or alternatively via another data exchange link in the vehicle. The key units and pieces of equipment (1, 2) are each equipped with a processor chip in which the function units which are each illustrated in block form in the figure and described below are implemented largely by means of software.

Each of the key units (1) has a transmitter (5) by which data can be transmitted unidirectionally in coded form via an infrared link (9) to the vehicle, where they are received and subsequently decoded by a receiver (10) in the input circuit component (2') of the locking control (2). Furthermore, each key unit (1) has a unit (7) for recursively generating, in a known manner, one-way function values of a Hash function (H) such as is used for example in cryptography. In the present embodiment, the RIPEMD function known from "Ripe Integrity Primitives, Final Report of RACE Integrity Primitives Evaluation (R1040) (June 1992), Part III Recommended Integrity Primitives, Chapter 3 RIPEMD, pp. 67–109", is used specifically as the hash one-way function. The bit length of a RIPEMD function value is 16 bytes; however, it is sufficient for the present purpose of vehicle security to transform the 16-byte into a shortened 8-byte value by means of a suitable algorithm in order to save memory space.

The hash algorithm is used to carry out the authentication processes according to the invention. Using the unit (7) for generating hash function values it is possible, by repeated application of the hash function starting with a respective starting value ($m_0$), to generate a number n of inverse images which are stored in an inverse image memory (3), so that they can be successively read out backwards, i.e. starting with the last value ($m_{n-1}$) of the respective inverse image sequence ($m_0, \ldots, m_{-1}$), into a buffer (4) under control of a counter (21). The reading out of the buffer (4) can be controlled by means of a starting signal (SST) which is generated by means of a user key (6).

Figure 2:
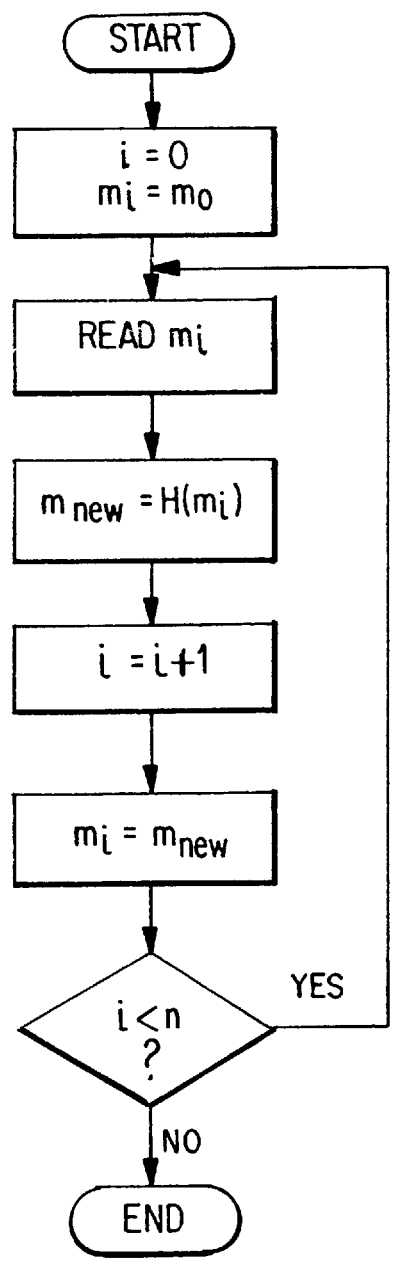
FIG. 2 illustrates in steps 201 through 206 the recursive generation and storage of respective values of the inverse image sequence $m_0$—...$m_{n-1}$ at the hand-held key unit.

This process is illustrated in FIG. 2, which shows repeated application of the hash function in Step 203 until the number i of inverse images reaches n in Step 206.

To synchronize the key unit and to the vehicle unit as may be required, for subsequent authentication processes, the RSA algorithm (mentioned above), which is used in cryptography, is implemented in the vehicle security device as a digital signature algorithm. For this purpose, the associated signature generating component (19), which contains a non-secret modulus (MOD) and a secret exponent (EG) for information coding, is accommodated in each key unit (1). An RSA data memory (24) which is arranged at the input, stores the data used in the formation of the RSA signature. In particular, this data comprises an item of identification data ($ID_S$), which includes vehicle-specific and key unit-specific data, a signature counter value (Z) and in each case the hash function value ($m_n$) of the initial value ($m_{n-1}$) of the sequence ($m_0$ to $m_{n-1}$) stored in the inverse image memory (3). (Since these values are read in reverse order, $m_{n-1}$ is the "initial value", $m_{n-2}$ is second, etc.)

In order to trigger a synchronization, a synchronization button (23) is provided to actuate a pseudo random generator (22) which provides the hash function value generator unit (7) which with a pseudo random value that cannot be predicted by third parties. (It can be made dependent for example on the value of the signature counter (Z) and the identification data ($ID_S$) and the secret RSA signature exponent (EG).) This pseudo random value then serves as a new initial value ($m_0$) for a value sequence which is newly written into the inverse image memory (3) by the hash function value generator unit (7). The final value ($m_n$) of the new sequence of the RSA signature generation is fed for transmission to the vehicle unit for the purpose of synchronization.

In the authentication process, the identification data ($ID_S$) and the inverse image ($m_i$) located respectively in the buffer (4) are logically linked, together with a function code, which is not shown in greater detail and which indicates the type of transmitted information (in this case an item of authentication information), to form the user code information (M) which is then emitted via the transmitter (5). On the other hand, in the case of a synchronization process (as distinguished from the authentication process, above) the signature (SIG), i.e., the output signal of the RSA signature generating component (19), is logically linked to the function code (which in this case designates the transmitted data as being for synchronization) and the identification data ($ID_S$), to form the synchronization information ($M_S$) which is then also output via the transmitter (5).

At the vehicle unit, the information input-end circuit component (2') of the locking control (2) contains, in addition to the receiver (10), an identification data memory (11), an identification data comparator (12) and a gate function (13), each implemented advantageously in the form of software. The comparator (12) compares the 8-byte identification data information ($ID_S$), extracted from an item of received user code information item (M) or an item of synchronization information ($M_S$), with the identification data information ($ID_K$) stored in the vehicle unit identification data memory (11), and feeds its output signal to a control input of the gate (13) whose other input has the user code in formation signal or synchronization information signal (M) fed to it.

The circuit component (2") for locking control, which is shown in the figure to the right of the two dotted vertical dividing line, is also present in an identical form in all the other pieces of equipment (2) included in the vehicle security system. It contains (again, advantageously in the form of software) a unit (14) for calculating hash function values and a gate function (15), to both of which the inverse image information ($m_i$) contained in the user code information (M) is fed. The output of this gate (15) is connected to a desired authorization information memory (16) with a number of memory locations corresponding to the number of key units (1), the individual memory locations being addressable as a function of the key identity ($ID_j$) which is contained in the transmitted identification data ($ID_S$), i.e. the key number. The output of this memory (16) is in turn connected to an input of a comparator block (17) to which the output signal (m') of the unit (14) for generating hash function values can be fed via a further input. This output signal (m') is also fed to a further gate block (18) whose control input is supplied with a non-correspondence signal ($N_U$) of the comparator (17).

When correspondence is detected by the comparator (17), it generates a use-enabling signal ($S_F$) in order to deactivate a state which blocks the software operability of the respective piece of equipment (2), and is part of an electronic disabling facility which keeps all these pieces of equipment disabled. The use-enabling signal ($S_F$), which represents a successful authentication (i.e., use authorization test), does not leave the associated piece of equipment and preferably does not even leave the chip area, which provides a high degree of protection against the use-enabling information being fed in by a third party without authorization. It is also fed as a control signal to the gate block (15) which is supplied with the transmitted inverse image information ($m_i$) in order to permit this information to be stored as an item of new desired authorization information.

Each control device (2) is also equipped with the verification component (20) which contains the RSA decoding algorithm and the non-secret input information, namely the modulus (MOD) and a non-secret verification exponent (EO). This verification component (20) receives the respective signature information (SIG) of a synchronization process for decryption, the decrypted values being loaded into an output buffer (25). The newly loaded hash function value ($m_{nnew}$) can be written as a new starting value for desired authorization information into the associated memory (16) via a gate (27) when an acceptable synchronization process is detected. For this purpose each piece of equipment (2) has a memory (26) in which on the one hand the previous synchronization counter value (Z) and on the other hand the identification data information (ID) are stored in a key unit-specific way. The latter data are compared in the respective comparators (28, 29) with the corresponding data ($Z_{new}$, $ID_{Snew}$) which are newly received as a result of a synchronization process. The outputs of the comparators (28, 29) are fed to control inputs of the gate function block (27).

As mentioned above, all the pieces of equipment (2) involved in the authentication process are also simultaneously involved in an electronic disabling facility which is activated each time the ignition is switched off, and can be deactivated again by a subsequent successful authentication process. Since the same authentication operations are carried out in all such pieces of equipment (2), all these units (2)

become simultaneously operational again when an authorized use request occurs, while in the case of an unauthorized use request at least one remains disabled. The distribution of the authentication process to all these pieces of vehicle equipment and the corresponding disabling thereof has the advantage that the vehicle cannot continue to be used by simply by replacing one or a small number of pieces of equipment and bypassing the necessity for authentication. Instead, all these pieces of equipment would have to be replaced, which would involve such high costs that such an attempt at unauthorized use by a third party would be unattractive.

The mode of operation of the vehicle security device which is constructed as described above is described below in detail.

The entire sequence begins initially before the vehicle is started up, with the necessary initialization process at the key manufacturer or a central key processing facility (SH) designed for this purpose. Here, the secret RSA signature exponent (EG) and the non-secret modulus (MOD) for each key unit (1) are initially fed into the signature generating component (19) as vehicle-specific RSA coding information which is identical for all units of the key set. (In comparison with providing an item of key unit-specific RSA coding information, which is also possible, this arrangement has the advantage that only one item of RSA decoding information, valid for all units of the key set, has to be stored at the vehicle unit.) In addition, the identification data ($ID_S$) are stored in each key unit (1) and the synchronization counter (Z) is set to zero. The identification data ($ID_S$) contain, in addition to vehicle-specific data, the key number ($ID_j$) which distinguishes among the key units which are simultaneously valid for one vehicle. With the exception of the receptive key number ($ID_j$), the identification data of the key units (1) are the same, and consequently form a kind of key set number.

The same identification data are also fed into the memory (11) of the associated locking control by the key manufacturer (SH). Furthermore, the non-secret modulus value (MOD) is made available to be input into all the pieces of equipment (2) by the manufacturer (FH) of the vehicle at the production line, or alternatively by the component manufacturer or by a garage when the equipment is being replaced. While the modulus value (MOD) depends on the selection of the secret exponent (EG), the non-secret exponent (EO) in the RSA method is permanently set to $2^{16}+1$ and can therefore always be immediately provided during the manufacture of the equipment. The initialization of the desired authorization information memories (16) is performed by a first synchronization process, for which purpose its contents are initially set to zero.

A synchronization process of this kind using the RSA algorithm is triggered, for example, for the first system initialization, or at the request of a user due to some other externally arising requirement, by actuating the synchronization button (23). This activates the pseudo random number generator (22) which supplies a corresponding random number ($m_0$) to the hash function value generator unit (7). The latter generates an inverse image sequence ($m_0$ to $m_{n-1}$) for a subsequent authentication series, by recursive calculation of hash function values, which are written into the inverse image memory (3). At the same time, the unit (7) which generates hash function values transmits the hash function value ($m_n$), which follows the last generated sequence value ($m_{n-1}$), to the RSA input memory (24), and the corresponding count value (Z) is incremented by one. Subsequently, the hash function value ($m_n$), the new counting value (Z) and the identification data ($ID_S$) are encrypted into the signature (SIG) as input information according to the known RSA signature relation:

$$SIG = input\ signal^{EG}\ (modulus\ MOD)$$

The resulting signature (SIG) is transferred, together with the unencrypted identification data ($ID_S$) as synchronization information ($M_S$) to the vehicle unit. Here, the input component (2') of the locking control initially tests the correctness of the identification data ($ID_S$). If it does not correspond with the vehicle unit identification data ($ID_K$), the synchronization process is aborted. If, on the other hand, it does correspond, the synchronization information ($M_S$) is passed through by the gate (13). As a result, the signature (SIG) passes via the data bus to the verification components (20) in the control devices (2) where it is decrypted to provide a test signal according to the RSA verification relation, which is also known:

$$test\ signal = SIG^{EO}\ (modulus\ MOD)$$

The decrypted values ($m_{mnew}$, $ID_{Snew}$, $Z_{new}$) are written into the memory (25) which is connected downstream of the RSA decoder for further processing. Such processing includes testing the correctness of the signature-transmitted message by comparing the transmitted identification data ($ID_{Snew}$) and synchronization counting value ($Z_{new}$) with the corresponding data stored in the memory (26) in a key-specific way. For this purpose, the key number ($ID_j$) is extracted from the transmitted synchronization message in order to access the correct memory locations. Then it is determined, on a key-specific basis, whether the newly input counter value ($Z_{new}$) is larger than the previous value ($Z_a$) and in a parallel comparison stage (29) it is determined whether the identification data is identical. If these comparisons are positive, the synchronization attempt is deemed valid, and the new counter value ($Z_{new}$) is written into the memory (26) as a new value; in addition, by enabling the gate (27), the transferred hash function value ($M_{nnew}$) is written into the corresponding memory (16) as desired authorization information, for a subsequent authentication process using this key unit.

There are various possibilities for storing the respective inverse image sequence ($m_0$ to $m_{n-1}$) in a manner which saves memory space. In one variant, which is associated with relatively frequent synchronization, the power (n) of a respective sequence is selected to be relatively small (for example, between 100 and 1000). The values are stored individually in the memory (3) and, as soon as the current inverse image sequence ($m_0$ to $m_{n-1}$) has been used entirely (or almost entirely with the exception of a prescribable residue), an RSA synchronization process is activated automatically, and generates a new inverse image sequence and correspondingly synchronizes the vehicle unit. If there is no provision of such automatically triggered RSA synchronization, and the intention is that synchronization should be possible only for exceptional cases at the request of the user, the power (n) of the inverse image sequence ($m_0$ to $m_{n-1}$) must be tailored to the maximum number of authentications to be expected during the service life of the key unit (for example, n=100,000 for approximately 20 actuations of the key per day with a service life of the key unit (1) of approximately 10 years).

By means of the function code, a special function for disabling a key unit can also be effected by the RSA data transmission process. For example, in this special function, the identification data ($ID_S$) may be set to an invalid value (such as zero) in the control device memories (26).

Since the storage of the (for example) 100,000 16-byte inverse images requires appropriate space, the following, memory space-saving alternative process is possible. Selected values of the generated hash function value sequence ($m_0$ to $m_{n-1}$) (for example, only every hundredth value), are permanently stored in the memory (3) as samples. Additionally, at all times, a then presently in use section of the value sequence ($m_0$ to $m_{n-1}$) between two samples (e.g. of 100 values) is stored in the memory (3); in this way at any time only 1100 8-byte values have to be stored in the memory (3). As soon as the end of the current value sequence section is reached as a result of ongoing use of the key, the formation of hash function values (7) is activated with the next sample as input information, in order to generate the next value sequence section between two samples. Thereafter, the used-up value sequence section is overwritten with the newly calculated one. Here, from the point of view of low memory requirement, a uniform memory distribution for the samples and for the region between two samples is even better, each memory component then containing a number of memory locations which corresponds approximately to the root of the power (n) of the entire value sequence ($m_0$ to $m_{n-1}$).

In order to minimize memory requirement, it is also possible only to keep the initial value ($m_0$) stored and to perform a repeated formation of hash function values starting from this starting value ($m_0$) after each activation of the key, repeating this formation successively one time less in each case, and then to feed the respective final value directly into the buffer (4). Any other distributions are equally possible, e.g. logarithmic sample selection. Wherever the inverse image memory (3) is overwritten, the associated pointer-type counter (21) is set to the final sequence value (n-1) from which it is reduced by one during each authentication attempt.

Figure 3:
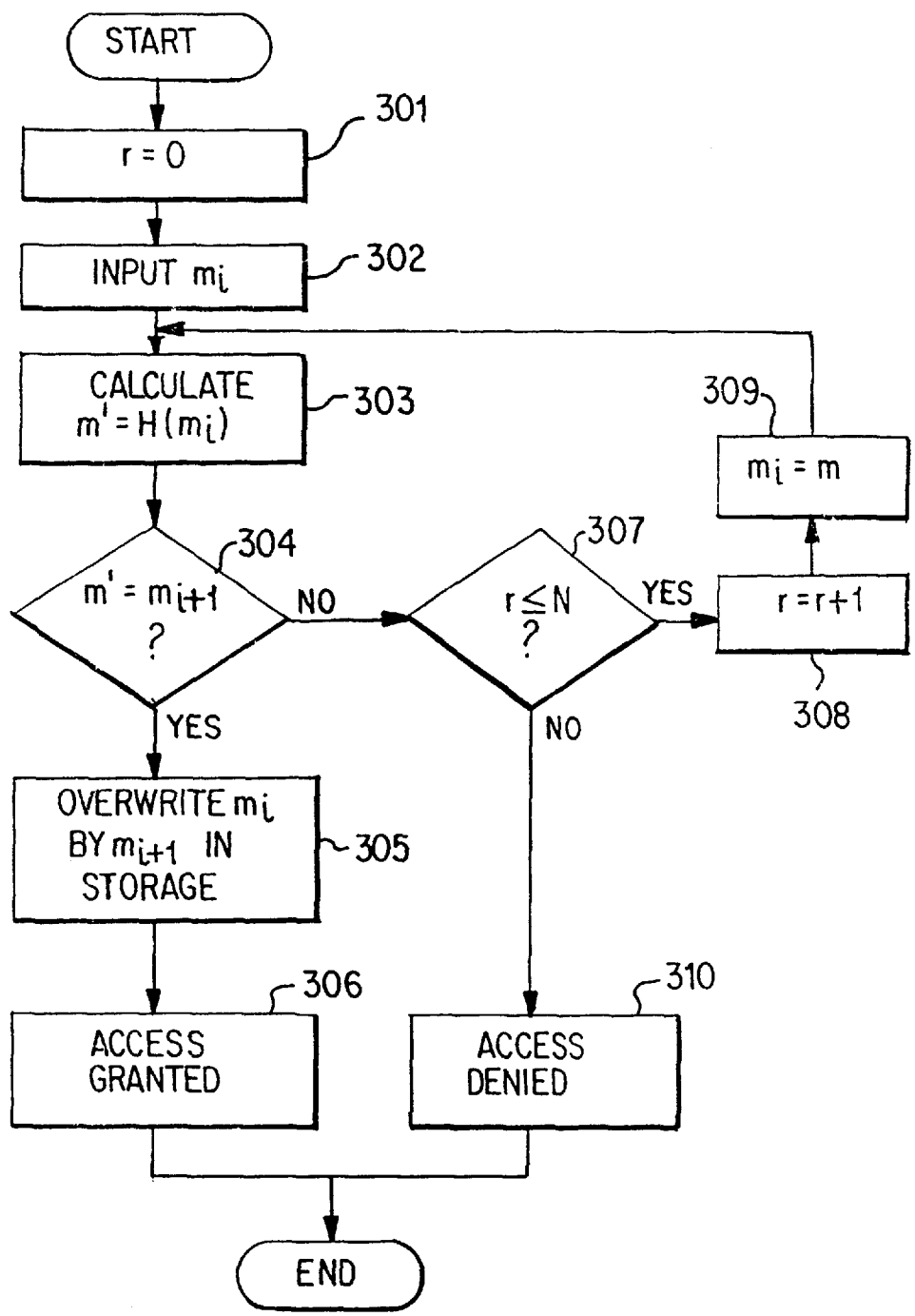
FIG. 3 shows the authorization process performed at the vehicle.

A typical authentication sequence, in which a user tries to demonstrate to the vehicle that he is authorized for use (trying, for example, to open the vehicle and deactivate the disabling facility which was activated when the vehicle was parked) is explained below with reference to FIG. 3 of the drawing. The authentication process is initiated by actuating the starting button (6) of a key unit (1). The starting signal ($S_{ST}$) which is thus generated, causes (after step 301) the inverse image ($m_i$) which is present in the buffer (4) to be read out (step 302 in FIG. 3) and passed to the transmitter (5) together with the key unit identification data ($ID_S$), as user code information (M). This latter information is fed from there to the vehicle-end receiver (10) via the infrared transmission link (9), where the identification data information ($ID_S$) is initially extracted in the locking control (2) and compared with the vehicle-end identification data ($ID_K$). If it does not match, a corresponding item of control information is sent to the gate block (13), and the user code information (M) is prevented from being passed on to the data bus (and from there to the other pieces of control equipment). The authentication process is then aborted without the vehicle being unlocked or the disabling facility being cancelled.

In the case of a successful authentication attempt, the transmitted inverse image ($m_i$) is passed on as a component of the transmitted user code information (M) from the locking control via the data bus to all the control devices (2) involved in the process, and is fed in each case to the hash function value generating unit (14) and to the gate (15). The unit (14) calculates the hash function value (m') (Step 303 in FIG. 3) which is associated with the fed-in inverse image ($m_i$) and passes this on as actual authorization information (m') to the comparator (17) and to the second gate (18). In the meantime, the associated key number ($ID_j$) is determined using the identification data ($ID_S$) contained in the user code information (M), and the value ($m_{i+1}$) stored in the associated memory location of the desired authorization information memory (16) is read out to the other input of the comparator (17). This value ($m_{i+1}$) corresponds to the inverse image information which is fed to the control device (2) during the last present authentication carried out successfully with this key unit (1). (It is important to note in this regard that the inverse images $m_0, \ldots, m_{n-1}$ stored in the memory (3) are read in reverse order. Thus, application of the hash function to a particular stored value ($m_i$) yields the previously transmitted value $m_{i+1}$.)

If the comparator (17) detects correspondence of the actual authorization information and desired authorization information (m'=$m_{i+1}$) (Step 304 in FIG. 3), it generates the use-enabling signal ($S_F$) which on the one hand, as a control signal fed back to the gate (15) triggers the overwriting of the respective memory location by the inverse image ($m_i$) fed in during this authentication (Step 305), and on the other hand brings about, together with the use-enabling information generated simultaneously in the other control devices involved in the process, the entire deactivation of the electronic disabling facility, so that all the control devices are restored to their operational state (Step 306).

If it is intended to save memory space in some of the pieces of equipment, there may be provision for only a portion, e.g. 2 bytes, of the entire desired authorization information ($m_{i+1}$) to be stored in the said pieces of equipment and to compare only this portion with the corresponding portion of the hash function value (m') in the comparator block (17). So that, nevertheless, faulty deactivation of the disabling facility can be prevented (which could otherwise occur because of the reduced comparison, particularly with a large capture range), for at least one piece of equipment, for example the locking control device, the complete code comparison is retained. The result of the comparison is transmitted to the devices with shortened comparison, and the generation there of the use-enabling information is associated with the presence of a positive result of the complete code comparison.

On the other hand, if the comparator function block (17) detects non-correspondence (provided that the number of successive non-correspondences has not yet exceeded the capture range by a number (N) of possible repetitions) it transmits a non-correspondence signal ($N_U$) to the gate (18) which in response feeds back the hash function value (m') generated at the output, back to the input side of the unit (14) for generating hash function values. The latter then carries out a renewed formation of hash function values using this input value (m'), the result of which is then transmitted to the comparator (17) as new actual authorization information (Step 307–309 in FIG. 3). This recursive generation of hash function values is continued until either the comparator (17) detects correspondence of one of the successively generated items of actual authorization information with the desired authorization information ($m_{i+1}$) present (after which, as stated above, generation is continued), or the loop repetition number has reached the maximum number (N), equal, for example, to the power (n) of a series of hash function values, prescribed by the capture range (Step 307). In the latter case, either the authentication process is aborted (Step 310) as unauthorized and the disabling facility continues to be activated, or a new item of user code information with correct identification data arrives, so that the loop counter is reset and the generation of hash function values is continued with the newly transmitted inverse image.

As already stated in brief above, the capture range serves to restore synchronization of the key unit and vehicle unit which have become out of step as a result of single or multiple actuation of the key without reception contact at the vehicle for the associated transmission protocol. That is, the vehicle unit is readjusted to the inverse image which is now present in the key (1) by means of successive formation of a corresponding number of hash function values within the capture range. If the capture range (N) is selected to be exactly as large as the power (n) of the sequence of inverse images, the synchronization for an authorizing key can always be restored within a series of hash function values $(m_0, \ldots, m_{n-1})$ of the capture range or when the starting value $(m_0)$ of the sequence is reached at the key unit by means of an RSA synchronization.

By virtue of the property, typical for hash function values, that the function values are assumed to be distributed with virtually identical probability over the entire value range, and by virtue of the fact that even when a reduced algorithm with 8-byte values is used, approximately $10^{20}$ function values are possible, it is extremely improbable, even with a capture range of $N=10^5$ that an unauthorized person, if he were to have somehow overcome the identification test, would achieve positive authentication by transmitting inverse function values on a trial and error basis using the capture range. However, it is also possible to prevent relatively frequent attempts of this kind by means of a corresponding time window or limit on the number of attempts within which an authorizing authentication would have to take place, while otherwise the vehicle would continue to be disabled in response to further authentication attempts. It is possible for such disablement to be cancelled for example only by the vehicle manufacturer via the diagnostic interface (19). Of course, the mode of operation of the vehicle security device proceeds in an analogous fashion for any other authentication process desired for the device and for other key units as described above.

The vehicle security device described herein offers a relatively high degree of protection against unauthorized use of a vehicle by third parties. In particular, a very secure code-protected way of performing synchronizations and special functions by means of RSA coding is provided, so that secure storage of secret items of code information at the vehicle unit can be dispensed with. This permits a plurality of pieces of vehicle equipment to be involved, without logistical security problems. In addition, complex bidirectional data communication between the key unit and vehicle unit is not necessary. Specifically, 64 bits are sufficient for the hash function code, and therefore the transmission time and the computational outlay during authentications are significantly lower than with a conceivable exclusive use of the RSA method. As an asymmetrical encryption method, the latter also requires storage of a secret item of information only at one end, but has a word length of 512 bits, and thus in view of the computational capacities present in a vehicle requires corresponding computational and transmission times.

The latter is not a problem for synchronizations which are carried out only from time to time; if desired, in each case a portion of an RSA signature can be transmitted together with authentication processes, and these portions then successively combined to form the complete signature. In this manner, a single RSA synchronization does not lead to a perceptible time delay.

It is apparent that only the units and operations which are most essential to the invention have been mentioned in the above example, and further customary units and operational sequences are additionally provided. A person skilled in the art is capable of performing, within the scope of the invention, a plurality of modifications of this embodiment, for example using another one-way function, application-specific changes to the stated numerical examples, dispensing with the identification test or using a chip card system instead of the infrared signal transmission. Additionally, the invention can be realized as a system with bidirectional exchange of authentication data, in which for example an item of random numerical information is transmitted from the vehicle to the key unit and transmitted back linked by an exclusive-OR operation to the inverse image information and is compared for correspondence. An embodiment of this kind prevents an unauthorized person having temporary possession of an authorizing key from producing successive user code information and it from successfully obtaining authentication with respect to the vehicle using this copied key. Of course, instead of the RSA method, a different asymmetrical signature method which is customary in cryptography can be used.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle security device having an electronic use-authorization coding arrangement comprising:

a user-end key unit for successively transmitting items of user code information, which items differ from one another;

a vehicle-end device for receiving the transmitted items of user code information, and generating as a function thereof an item of actual authorization information; and means for comparing said item of actual authorization information with an item of desired authorization information present at the vehicle unit, and for generating an item of use-enabling information based on a result of said comparing; wherein:

said user-end key unit includes a signature generating component which utilizes a digital signature algorithm, and which signal generating component has stored therein an item of secret encryption information, for encrypting and transmitting user code information or synchronization information, said user code information or synchronization information containing an item of new desired authorization information, together with a signature generated by said digital signature algorithm; and said vehicle end device includes a verification component which utilizes said digital signature algorithm, and which verification component contains an item of non-secret decryption information, for receiving and decrypting said user code information or synchronization information.

2. Vehicle security device according to claim 1 wherein said digital signature algorithm comprises an asymmetrical signature method.

3. Vehicle security device according to claim 2 wherein said asymmetrical signature method comprises an RSA algorithm.

4. Vehicle security device according to claim 1 wherein:

each transmitted item of user code information contains a respective inverse image for a one-way function, each of said inverse images being different from previously transmitted inverse images;

the desired authorization information is in each case a one-way function value associated with the inverse image contained in an item of associated user code information;

determination of actual authorization information from the received user code information is achieved by forming a one-way function value associated with the inverse image contained in the received user code information; and synchronization information is transmitted in a synchronization process from the key unit to a piece of equipment having the signature therein, which synchronization information contains in each case an item of new desired authorization information for a subsequent authentication process.

5. Vehicle security device according to claim 4 wherein:

in each case after a prescribed number of authentication attempts, a synchronization process takes place using a signature method to prescribe an item of new desired authorization information;

successively transmitted inverse images between two new specifications of the desired authorization information constitute in each case a sequence which arises from repeated application of the one-way function, the newly prescribed desired authorization information being the one-way function value of the final sequence value and said inverse images being used in opposite order to the sequence formation, to form the successive user code information; and the desired authorization information is set after each positive authentication process with the key unit to that inverse image which has been transmitted during this authentication process with the user code information.

6. Vehicle security device according to claim 4 wherein after each negative result of the comparison of actual authorization information and desired authorization information, for a prescribed maximum number of repetitions an item of new actual authorization information is determined as a one-way function value of the previous actual authorization information, and the said new actual authorization information is compared with the desired authorization information.

7. Vehicle security device according to claim 4 wherein a cryptographic hash function is used as one-way function.

8. Vehicle security device according to claim 7 wherein the RIPEMD function is used as a cryptographic hash function.

9. Vehicle security device according to claim 8 wherein:

a plurality of authorizing, user-end key units for a vehicle are provided, each having an RSA signature generating component containing the same vehicle-specific encryption information as that contained in the other user end key units;

the transmitted user code information and synchronization information each contain an item of key identification information; and each vehicle-end device has a memory for storing an item of specific desired authorization information for each key unit, which memory can be addressed with the aid of the key identification information, during a synchronization process or after a positive authentication process, and can be read out of the said memory during an authentication process.

10. Vehicle security device according to claim 1 wherein a plurality of vehicle-end devices each of which includes a verification component of the digital signature algorithm, is arranged in parallel to determine respective actual authorization information from an item of received user code information, compare it with the desired authorization information and generate an item of use-enabling information dependent on an outcome of said comparison.

11. Vehicle security device according to claim 1 wherein said vehicle end device comprises a locking control device of the vehicle.

12. Vehicle security device according to claim 1 wherein:

the respectively transmitted information contains an item of vehicle-specific and key unit-specific identification information; and the identification information of an item of received information in a vehicle-end device can be evaluated in advance, an authentication or synchronization process being aborted after non-authorizing, transmitted identification data are detected.

* * * * *